May 17, 1960  J. L. KUKOWSKI ET AL  2,936,891
FILTER UNIT
Filed March 26, 1957

JOHN L. KUKOWSKI
JULIUS P. KOVACS
ALFRED J. PIERFEDERICI
INVENTORS

BY Lawrence J. Winter
ATTORNEY

United States Patent Office 2,936,891
Patented May 17, 1960

2,936,891
FILTER UNIT

John L. Kukowski, Elizabeth, Julius P. Kovacs, Westfield, and Alfred J. Pierfederici, South Plainfield, N.J., assignors to Purolator Products Inc., Rahway, N.J., a corporation of Delaware Application March 26, 1957, Serial No. 648,708

3 Claims. (Cl. 210—131)

The present invention relates to filters, and more particularly to a disposable type of filter unit.

An object of the present invention is to provide full flow or partial flow cellular porous filter which can be produced in an economical manner.

Yet, another object of the present invention is to provide a depth type filter unit the ends of which act as end seals thus eliminating the need for bonding end caps thereto.

An object of the present invention is to provide a cellular filter element having means for providing a balanced pressure on the inner and outer portions thereof to prevent collapse of the element.

An object of the present invention is to provide a cellular type filter element that is self-supporting.

The present invention further provides a filter unit having a simple mechanical pressure relief system incorporated therein wherein the filter element acts as the valve piston.

Another object of the present invention is to provide a filter unit having simple and economical check valve means incorporated therein.

The present invention also provides a filter element with a wall thickness providing optimum flow rate and contaminant removal therein while retaining sufficient structural strength throughout the element.

An object of the present invention is to also provide a filter element comprising a plurality of cellular elements which act as filters independently of one another and discharge into a common oil sump or manifold.

The invention will be better understood from the following description when taken into connection with the accompanying drawings forming a part thereof and in which.

Figures 1, 2, 3:
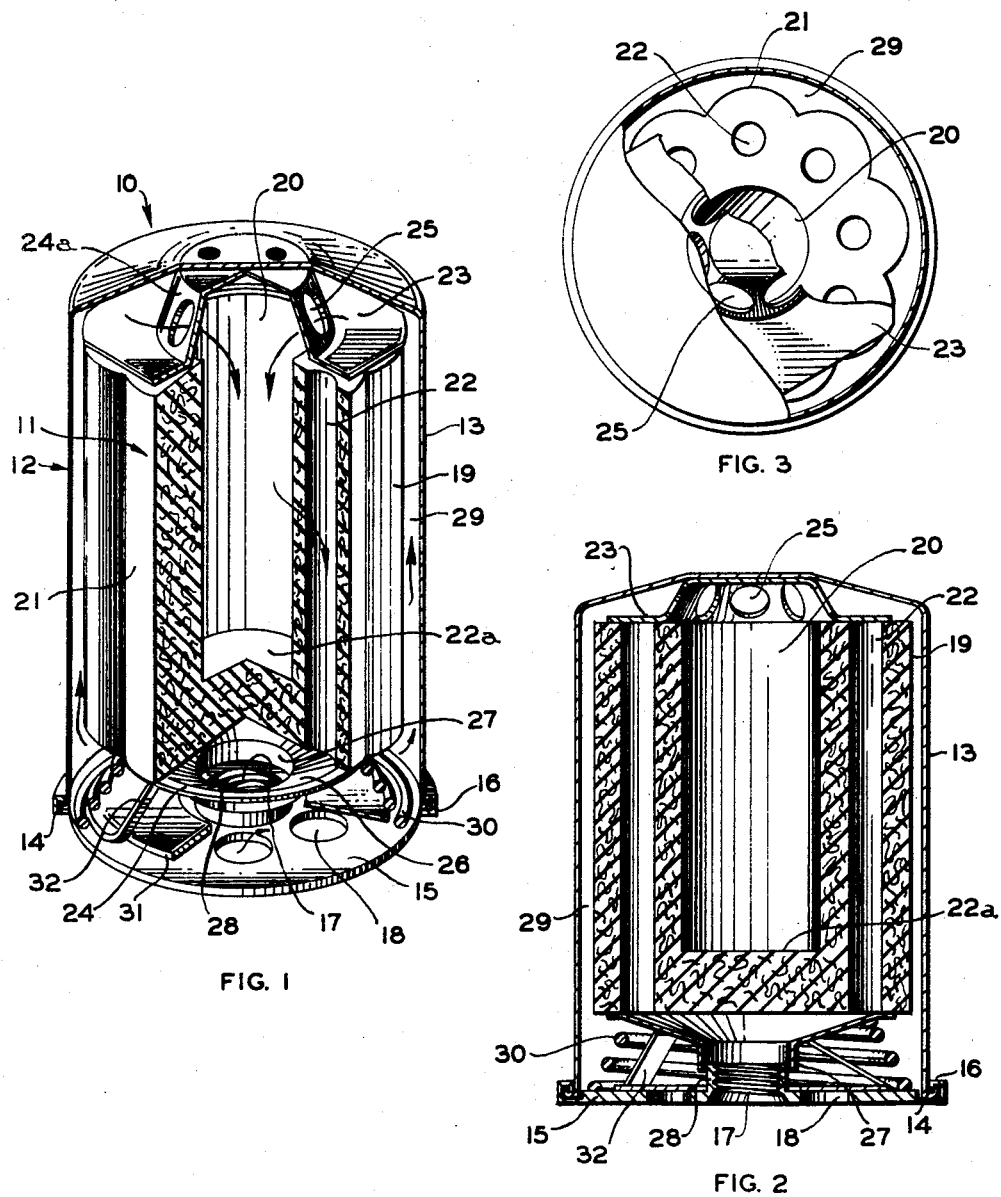
Fig. 1 is an isometric view, partially broken away, showing the filter unit embodying the present invention.
Fig. 2 is a vertical section of the filter unit.
Fig. 3 is a transverse section of the filter unit.

Referring to the drawings, the reference numeral 10 generally designates a throw-away type oil filter unit embodying the present invention. The filter element 11 is enclosed in a housing 12 formed of a metal cylindrical casing 13 provided with a lip 14 on the lower edge thereof and a circular flat plate or closure member 15 having a lip 16 that is rolled over a lip 14 of cylindrical casing 13. Closure 15 has a central opening 17 therein with an upwardly extending internally threaded neck thereon which forms the discharge or outlet for the filter unit. A plurality of spaced openings or ports 18 are disposed circumferentially of outlet 17 in closure 15 for supplying oil to be filtered to the unit.

Filter element 11 is a porous, depth type filter media, as distinguished from a membrane or surface type filter media, formed into a cellular structure from a water-resin emulsion throughout which the fibrous filter media is dispersed, and may be formed as described in the co-pending application Serial Number 580,377 filed April 24, 1956, and now abandoned. This emulsified dispersion is poured into a mold of desired configuration. The molded mass is then dehydrated and the resin cured by being heated between 350° F. and 450° F. This produces the porous, cellular depth type filter media indicated by reference numeral 11.

Filter element 11 comprises an annular cellular member 19 having a centrally disposed cylindrical counterbore or recess 20 therein. The outer surface of member 19 is notched or serrated to form a plurality of convoluted sections 21 each having a concentric drain slot or vertical passage 22 extending therethrough. A web 22a is formed in the lower portion of the filter element below counterbore 20 joined to sections 21. The walls of section 21 and web 22a are approximately of the same thickness.

Element 11 is disposed in housing 12 between upper and lower annular end plates 23 and 24 respectively. Plate 23 has an inverted cupshaped portion 24a provided with spaced openings 25 therein and is fixed concentrically to the inner surface of cylindrical casing 13 by spot-welding or in any other well known manner. Lower plate 24 comprises an inverted conical shaped member 26 having a horizontal lip on the periphery thereof and a downwardly extending portion or sleeve 27 adapted to slidably fit over the upwardly extending neck 28 of closure 15 which surrounds discharge opening 17.

The outer diameter of cellular element 11 is less than the inner diameter of cylindrical casing 13 so as to form an oil inlet chamber 29 therebetween in communication with the inlet openings 18 in closure 15 and the openings 25 of plate 23. A helical spring 30 is mounted between closure 15 and plate 24 to provide biasing means which force plate 24 against the lower end of cellular element 11 in fluid tight relationship therewith and the upper end of the element against the horizontal portion of plate 23 in fluid tight relationship therewith so that incoming oil entering the assembly through ports 18 will flow through the cellular element and be filtered before passing out of the assembly through drain slots 22. Thus, this arrangement eliminates the necessity of bonding end caps to the filter element to seal the ends thereon.

A portion of the incoming oil to be filtered will flow through openings 25 of upper plate 23 and pass downwardly through counterbore 20 through the web portion of the cellular element 11 and be discharged therefrom through outlet opening 17.

The provision of the central counterbore 20 in element 11 provides means for balancing or equalizing the oil pressure acting on the inner and outer surfaces of the element to prevent collapse thereof. This permits the cellular element to be self-supporting so that no other support means is required, as when the flow of oil through a cellular filter element is from one side only.

An annular check valve 31 is seated on closure 15 to mask or cover inlet ports 18 therein when oil is flowed into the filter assembly from a source not shown. Check valve 31 may be formed of sheet metal and has a plurality of upwardly extending resilient fingers or tongues 32 adjacent the periphery thereof that press against the underside of conical plate 24. The pressure of the incoming oil to the filter assembly lifts check valve 31 from its seated position on closure 15 while any decrease in the oil supply pressure will cause the oil pressure in the filter unit to seat the check valve and close off inlet ports 18 and prevent backflow.

In the present invention, should the filter media mass of element 11 become clogged for any reason to prevent the flow of oil therethrough, the incoming oil will flow through passage 29 and ports 25 into counterbore 20 and force element 11 and lower plate 24 to move downwardly in the housing compressing spring 30 so that the upper end of element 11 separates from plate 23 to permit the incoming oil to by-pass the cellular element and flow through drain slots 22 and out of the assembly through outlet opening 17.

Inasmuch as changes may be made in the form, location and relative arrangement of the several parts without departing from the essential characteristics of the invention, it will be understood that the invention is not to be limited except by the scope of the appended claims.

What is claimed is:

1. In combination, an oil filter unit comprising a cylindrical casing open at one end, a closure member secured to said end having an oil inlet port therein, said closure member having a nipple to provide an oil outlet, a conical member having a rim slidably disposed on said nipple, the interior of said conical member communicating with said nipple, a fibrous filter element in said casing comprising an annular upper portion providing a central recess and a lower web portion joined to said annular portion, spaced drain passages extending through said annular portion, said filter element being seated on said rim so said passages communicate with the interior of said conical member, an end plate fixed to the interior of the casing having a horizontal rim seated on the opposite end of said filter element to close off the ends of said passages, said plate having an inlet therein communicating with said central recess and said inlet port to permit incoming oil to act against said web section, and biasing means maintaining said element against said end plate and said nipple against said element to prevent by-passing of the filter element when the oil pressure acting against said web section is below a predetermined value, and adapted to permit said filter element to separate from said end plate when said oil pressure increases above said predetermined value, whereby said filter element acts as a relief valve.

2. In combination, an oil filter unit comprising a cylindrical casing open at one end, a closure member secured to said end having an oil inlet port therein, said closure member having an internally threaded nipple disposed centrally thereof extending into said casing to provide an oil outlet, an inverted conical member having a horizontal rim slidably disposed on said nipple, the interior of said conical member communicating with said nipple, a fibrous filter element in said casing comprising an annular upper portion providing a central recess and a lower web portion joined to the annular portion, spaced drain passages extending through said annular portion, said filter element being seated on said rim so said passages communicate with the interior of said conical member, a cup shaped end plate secured to the interior of said casing having a horizontal rim seated on the opposite end of said filter element to close off the ends of said passages, said cup shaped plate having an inlet therein communicating with said central recess and said inlet port to permit incoming oil to act against said web section, and biasing means maintaining said element against said end plate and said nipple against said element to prevent by-passing of the filter element when the oil pressure acting against said web section is below a predetermined value, and adapted to permit said filter element to separate from said end plate when said oil pressure increases above said predetermined value, whereby said filter element acts as a relief valve.

3. In combination, an oil filter unit comprising a cylindrical casing open at one end, a closure member secured to said end having an oil inlet port therein, said closure member having an internally threaded nipple disposed centrally thereof extending into said casing to provide an oil outlet, an inverted conical member having a horizontal rim slidably disposed on said nipple, the interior of said conical member communicating with said nipple, a fibrous filter element in said casing comprising an annular upper portion providing a central recess and a lower web portion joined to said annular portion, spaced drain passages extending through said annular portion, said filter element being seated on said rim so said passages communicate with the interior of said conical member, a cup shaped end plate fixed to the interior of said casing having a horizontal rim seated on the opposite end of said filter element to close off the ends of said passages, said cup shaped plate having an inlet therein communicating with said central recess and said inlet port to permit incoming oil to act against said web section, and biasing means comprising a coiled spring mounted between said closure member and the bottom of said conical member maintaining said element against said end plate and said nipple against said element to prevent by-passing of the filter element when the oil pressure acting against said web section is below a predetermined value, and adapted to permit said filter element to separate from said end plate when said oil pressure increases above said predetermined value, whereby said filter element acts as a relief valve.

References Cited in the file of this patent

UNITED STATES PATENTS

| 1,191,628 | Trinks | July 18, 1916 |
| 1,768,350 | Chase | June 24, 1930 |
| 1,913,401 | Liddell | June 13, 1933 |
| 1,967,991 | Eggert | July 24, 1934 |
| 2,145,535 | Vokes | Jan. 31, 1939 |
| 2,374,755 | Kisch | May 1, 1945 |
| 2,422,647 | Vokes | June 17, 1947 |
| 2,480,108 | Barker | Aug. 30, 1949 |
| 2,521,060 | Hallinan | Sept. 5, 1950 |
| 2,739,118 | Carey | Mar. 20, 1956 |

FOREIGN PATENTS

| 1,082,969 | France | June 23, 1954 |
| 95,604 | Sweden | May 2, 1939 |